US011591089B2

(12) United States Patent
Sivignon et al.

(10) Patent No.: US 11,591,089 B2
(45) Date of Patent: Feb. 28, 2023

(54) AIRCRAFT CABIN COMPRISING A CARGO AREA INTENDED TO ACCOMMODATE PASSENGERS

(71) Applicant: SAFRAN, Paris (FR)

(72) Inventors: Sébastien Sivignon, Hurigny (FR); Etienne Marecal, Villefontaine (FR); Claude Martin, Lury sur Arnon (FR); Ramon Blauwhoff, Leimuiden (NL)

(73) Assignee: SAFRAN, Paris (FR)

( * ) Notice: Subject to any disclaimer, the term of this patent is extended or adjusted under 35 U.S.C. 154(b) by 285 days.

(21) Appl. No.: 16/613,767

(22) PCT Filed: May 18, 2018

(86) PCT No.: PCT/EP2018/063099
§ 371 (c)(1),
(2) Date: Nov. 14, 2019

(87) PCT Pub. No.: WO2018/211077
PCT Pub. Date: Nov. 22, 2018

(65) Prior Publication Data
US 2020/0079508 A1    Mar. 12, 2020

Related U.S. Application Data

(60) Provisional application No. 62/508,444, filed on May 19, 2017.

(30) Foreign Application Priority Data

Jul. 10, 2017    (FR) ...................................... 1756525

(51) Int. Cl.
*B64D 11/00*    (2006.01)
*B64C 1/00*    (2006.01)
*B64D 11/02*    (2006.01)

(52) U.S. Cl.
CPC ............... *B64D 11/00* (2013.01); *B64C 1/00* (2013.01); *B64D 11/02* (2013.01);
(Continued)

(58) Field of Classification Search
CPC .... B64C 2001/0018; B64C 2001/0027; B64D 11/00; B64D 11/02; B64D 11/003; B64D 11/04
See application file for complete search history.

(56) References Cited

U.S. PATENT DOCUMENTS 5,395,075 A * 3/1995 Sprenger ................ B64D 11/00
244/129.6
5,784,836 A * 7/1998 Ehrick ................... B64D 11/00
52/79.8
(Continued)

FOREIGN PATENT DOCUMENTS

WO    9614243 A1    5/1996
WO    2008102278 A2    8/2008
(Continued)

OTHER PUBLICATIONS

Brown, David Parker. "Riding on the Upper Deck of an EVA Air Boeing 747—In Economy Class." Airline Reporter, Aug. 26, 2015, www.airlinereporter.com/2015/08/eva-air-economy-my-first-upper-deck-flight-on-a-boeing-747. Accessed Apr. 22, 2022. (Year: 2015).*
(Continued)

*Primary Examiner* — Joshua J Michener
*Assistant Examiner* — Ka Chun Leung
(74) *Attorney, Agent, or Firm* — Christensen O'Connor Johnson Kindness PLLC

(57) ABSTRACT

An aircraft cabin includes an upper deck, and a cargo area. The cargo area is configured to accommodate at least one passenger and is situated at a different level than the upper deck. An accessway provides access between the upper deck and the cargo area. The upper deck has, at least locally, a raised floor in the vicinity of the accessway so that at least one part of the cargo area has a ceiling height higher than the ceiling height of the rest of the area cargo.

9 Claims, 10 Drawing Sheets

Figure 1A:
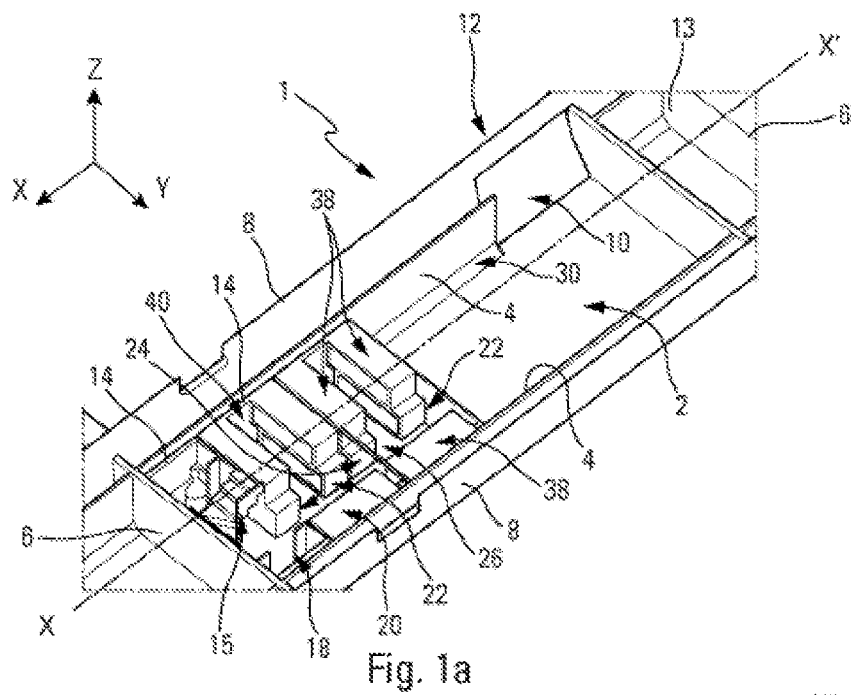

(52) U.S. Cl.
CPC ............... *B64C 2001/0027* (2013.01); *B64D 2011/0046* (2013.01); *B64D 2011/0069* (2013.01)

(56) References Cited

U.S. PATENT DOCUMENTS

| | | |
|---|---|---|
| 2007/0267544 A1 | 11/2007 | Linero et al. |
| 2009/0050738 A1* | 2/2009 | Breuer .................. B64D 11/02 244/118.5 |

FOREIGN PATENT DOCUMENTS

| | | | |
|---|---|---|---|
| WO | 2008139212 A1 | 11/2008 | |
| WO | WO-2017054945 A1 * | 4/2017 | ............. B64D 11/02 |
| WO | WO-2018037268 A1 * | 3/2018 | ............. B64D 11/00 |

OTHER PUBLICATIONS

International Search Report dated Jun. 29, 2018, issued in corresponding International Application No. PCT/EP2018/063099, filed May 18, 2018, 7 pages.
Written Opinion of the International Searching Authority dated Jun. 29, 2018, issued in corresponding International Application No. PCT/EP2018/063099, filed May 18, 2018, 6 pages.
Written Opinion of the International Searching Authority dated Jun. 29, 2018, issued in corresponding International Application No. PCT/EP2018/063099, filed May 18, 2018, 5 pages.
International Preliminary Report on Patentability dated Nov. 19, 2019, issued in corresponding International Application No. PCT/EP2018/063099, filed May 18, 2018, 1 page.
Kingsley-Jones, M., "Airbus Achieves More A350 Gains Latest Specification Introduces Improvements That Alleviate ILFC Concerns, Allowing US Lessor To Place 12 Orders", Flight International, Reed Business Information, Sutton Surrey, 168(5014), Dec. 2005, p. 14, XP001238332.

* cited by examiner

AIRCRAFT CABIN COMPRISING A CARGO AREA INTENDED TO ACCOMMODATE PASSENGERS

The present invention relates to an aircraft cabin comprising a cargo area intended to accommodate passengers.

In aircraft, in particular in long-haul aircraft with two main aisles, the lower deck comprises a cargo area that is often underused and/or has reduced occupancy. It has therefore already been considered to convert the cargo area into a cabin space, i.e. a space intended to accommodate passengers, in particular in seats, during the flight. Such an arrangement can be definitive or temporary and/or achieved in a reversible or irreversible manner. The term "temporary and/or reversible" is used to describe an arrangement that can be quickly installed and removed, as necessary, to use the cargo area either conventionally for the transport of goods, or as indicated above and according to the invention, to accommodate passengers.

The lower deck is made accessible from an upper deck that conventionally accommodates the passengers and the cabin crew in charge of welcoming said passengers, and of ensuring their comfort and safety, to enable the passage from the upper deck to the lower deck. The term "cabin crew" is used here and in the following description to describe the staff (hostesses, stewards, etc.) working and operating in the aircraft during the various phases of flight, with the exception of the staff working on piloting the aircraft. Furthermore, it must also be noted that the term "cabin crew" is meant to exclude the passengers.

In the present description, the term "upper deck" is used to describe the conventional spaces where the passengers of an aircraft are seated. Thus, for an aircraft of the Boeing 747 or Airbus A380 type, the term "upper deck" includes the two superimposed spaces wherein passengers are seated. Thus, according to the invention, the term "upper deck" is used as opposed to the "lower deck", because the upper deck is intended to accommodate passengers, while the "lower deck" is, in the scope of the present invention, intended to accommodate passengers and/or to receive loads and/or goods stored in the cargo area of the aircraft.

According to guidelines and regulations applicable at the date of the invention, the presence of passengers in the lower deck is allowed only during periods of flight outside of taxiing, take-off and landing phases. During these phases, all passengers must be seated in the upper deck area.

The difficulties relating to the arrangement of a cargo area in order to accommodate passengers are numerous. Firstly, the configuration of the arrangement of the cargo area into an accommodation area for passengers should be flexible, i.e. it can be arranged according to various configurations, and it should be able to adapt to various types of aircraft to be equipped and to the demand in terms of passengers and/or goods to be transported. In addition, the costs incurred for the arrangement of the cargo area to accommodate the passengers should be as reduced as possible in order to ensure the economic viability of such a solution. At the same time, the irreversible changes to the aircraft, such as providing an access opening between the floor of the upper deck and the cargo area, or providing an interface enabling the supply of various fluids, and in particular electrical power and air conditioning, to the cargo area intended to accommodate the passengers, must be reduced to a minimum. Finally, the cargo area must be able to return to its initial purpose, i.e. an area dedicated to the transport of goods, in a minimum amount of time, and without the arrangements made to accommodate the passengers limiting its capacities.

However, the low ceiling height of the cargo zone creates a problem. Indeed, passengers and/or cabin crew members located in the cargo area are not able to stand up. Such a situation is detrimental to the comfort of the passengers and/or the members of the cabin crew.

Currently, the arrangements proposed do not adequately meet these goals.

The present invention proposes to improve the situation. To this end, it relates to a modular arrangement intended to accommodate at least one passenger of an aircraft. Said arrangement comprises at least one module, in particular a structural element, configured to be arranged in a removable manner in a cargo area of the aircraft.

The module comprises an access means from an upper deck of the aircraft, the access means being in particular housed in the structural element, the module being configured to enable communications between the upper deck and at least one space external to the module and located in the cargo area, so as to form a module, termed "access module".

In a variant, the module can comprise a comfort device to improve the comfort of the passenger, in particular housed in the structural element. In addition, the module can be configured to be in communication with at least one space, external to the module and located in the cargo area so as to form a module, termed "comfort module".

In a variant, the module can form a functional module, i.e. a module configured to communicate with at least one space external to the module, located in the cargo area, so as to supply the cargo area, and in particular to supply other modules located in the cargo area, with power, in particular electrical power, with data, in particular with digital data, and/or with fluids. The functional module is advantageously configured to be connected to one or more on-board systems of the aircraft.

In yet another variant, the module can form a sanitary module, i.e. a module configured to communicate with at least one space external to the module, in particular one or more other modules located in the cargo area, the sanitary module comprising toilets for the passengers and/or members of the cabin crew.

With the module according to the invention, it is possible to flexibly equip the cargo area. In addition, according to the present invention, the cargo area is configurable according to various modular arrangements designed to meet the requirements and/or preferences, in particular, of an airline company. This type of flexibility and/or modularity is achieved in particular with a limited number of elements taken from a catalogue of standard modules, the different combinations of which will adapt the arrangement of the cargo area based on needs, taking into account the specificities of the aircraft. In addition, the present invention in particular enables various orientations of the access means, in order to achieve an optimal configuration and to optimise space occupancy in the cargo area and/or the upper deck. The modules furthermore allow to quickly empty the cargo area in order to ensure its quick return to full capacity.

In the case of access modules, the module is preferably intended to be associated with one or more comfort modules. It can also be used to equip a cargo area having an area intended to accommodate passengers, said area not being achieved with comfort modules.

In the case of comfort modules, the module is preferably intended to be associated with one or more other comfort modules and/or at least one access module. It can also be used to equip a cargo area having an area intended to accommodate passengers but that is not fully made of comfort modules and/or of which access from the upper deck is not achieved by means of an access module.

In particular, in the case of an access module, the module can comprise a lower part and an upper part forming a ceiling for the lower part. The ceiling is advantageously independent from and secured to the lower part. The ceiling comprises a housing providing access inside the module, such a housing being intended to be provided opposite an access hatch provided in a floor of the upper deck of the aircraft. Said housing has, for example, a shape that is substantially similar to the shape of the access hatch. In a variant, the housing is bigger than the access hatch. In yet another variant, the module is fully open in its top part.

The invention also proposes a cabin of an aircraft comprising a cargo area, an upper deck, located at another level to the cargo area, and at least an access means enabling the upper deck to communicate with the cargo area. The cargo area is configured to accommodate at least one passenger. The access means comprises an access means, such as a staircase, and the upper deck has at least locally a raised floor, in particular in the vicinity of the access means, so as to provide at least a part of the cargo area with a ceiling height that is greater than the ceiling height of the rest of the cargo area.

The invention rests in particular on the applicant's observation that the use of spaces forming a right angle with the areas surrounding the access means at the upper deck can be achieved with reduced ceiling height. It is therefore possible to locally raise the floor of the upper deck, without affecting the conditions of use of the aforementioned spaces. This localised raising of the floor of the upper deck provides a greater ceiling height in at least one part of the cargo area. The passengers and cabin crew members present in this part of the cargo area are therefore able, at least locally, to stand up.

According to the complementary or alternative characteristics of the invention, which can be considered individually or as a combination of one or more thereof:
- the module is configured to communicate with an adjacent module,
- the module is configured to be provided next to a neighbouring, adjacent or contiguous module, in particular along a longitudinal axis of the aircraft, advantageously also corresponding to a longitudinal direction of the module,
- the module is configured to extend over all or part of the width of the cargo area, in particular over a full width of the cargo area,
- the module is configured to be loaded into the cargo area through a side of the aircraft,
- the module is configured to be moved along the longitudinal direction of the module during its installation,
- the module comprises a first passage and/or a second passage configured to communicate with a first module and/or a second neighbouring, adjacent or contiguous module, in particular at the level of their corresponding respective passages,
- the first passage and the second passage are located at the level of opposite faces of the module along a direction that extends parallel with the longitudinal axis of the module,
- the module comprises a main aisle between the first passage and the second passage,
- the first passage and the second passage are located in the extension of one another along the longitudinal direction of the module,
- the main aisle is rectilinear,
- in a variant, the main aisle is S-shaped,
- said module, in particular said structural element, comprises a box configured to be loaded in the aircraft in a removable manner,
- the box comprises side faces, configured to engage with guides of the cargo area for the positioning of the module inside the cargo area,
- the side faces comprise a cutaway, configured to engage with the guides of the cargo area for the positioning of the module inside the cargo area,
- the box comprises end faces, configured to be arranged opposite the corresponding faces of neighbouring modules, such that two neighbouring modules thus formed are separated by a double wall thickness,
- in a variant, the box comprises an end face and an opposite open end side such that two adjacent modules thus formed are separated by a single wall thickness, by bringing the open side of one in contact with the end face of the other,
- in a variant, the box comprises two open end sides such that two adjacent modules thus formed are not separated by a wall,
- the module comprises inner walls, for example intended to be oriented along the longitudinal axis of the aircraft and/or perpendicular to the longitudinal axis of the aircraft, the inner walls compartmentalising the modules so as to form independent spaces, in particular meeting rooms,
- the box comprises attachment means to the cargo area,
- the module comprises at least one internal network, for the distribution of power, in particular electrical power, for the transmission of data and/or for the distribution of fluids, and at least a connection interface of the circulation network with the exterior of the module,
- the connection interface of the module is configured to engage with at least one connection interface of the neighbouring module,
- the connection interface of the module is configured to engage with the cargo area,
- the comfort device comprises one or more sleeping units,
- the module comprises one or more storage compartments, in particular for valuables such as handbags, laptops or other items,
- the storage compartments are integrated with the sleeping units and/or located close to the sleeping units,
- a first sleeping unit is arranged parallel with the main aisle,
- a second sleeping unit is arranged perpendicular to the main aisle,
- the box has a dimension along the longitudinal direction of the module ranging from 150 to 240 cm,
- the access means comprises a staircase, or a ladder,
- the access means opens onto a landing of the cargo area, in particular connecting to the main aisle,
- the ladder can be straight, form a quarter-turn or a half-turn,
- the structural element, in particular the box, is configured to enable the staircase to be secured according to various predetermined configurations,
- the box comprises anchoring means of the staircase evenly distributed at the level of a base and/or a floor of the box,
- the module comprises toilets and/or a service area, in particular intended for the cabin crew,
- the toilets and/or service areas are located on either side of the staircase along the longitudinal direction of the module, and/or the upper face of the module comprises a recess forming a right angle with the landing of the cargo area.

The invention also relates to an aircraft cabin comprising one or more modules such as described previously, arranged in particular at the level of the cargo area of the aircraft.

According to various additional or alternative features of the invention, which can be considered individually or as a combination of one or more thereof:
- one of the modules is an access module and at least one of the other modules is a comfort module,
- the modules are positioned in succession along a longitudinal axis of the aircraft,
- the modules communicate with one another, such that the passenger can go from one module to the next,
- the comfort modules are identical,
- in a variant, the comfort modules are of different types, selected from a limited number of standard modules,
- the cargo area has a lowered floor, at least at the level of the module or modules,
- the floor of the module or modules fits with the shape of the floor of the cargo area,
- the upper deck features at least locally a raised floor, so as to provide a part of the cargo area with a ceiling height that is greater than the ceiling height of the rest of the cargo area,
- the upper deck comprises an inclined partition forming, at least partially, a ceiling keeping a relatively constant ceiling height above each step or flight of steps of the staircase,
- the raised floor is located at the level of the landing,
- the upper deck comprises a wash-stand, toilets and/or a service area opposite the inclined partition,
- the raised floor forms a floor of the upper deck in front of the wash-stand, the toilets and/or the service area of the upper deck, and/or
- the raised floor is located at the level of a surface of the cargo area located in the vicinity of the last steps of the staircase, on the cargo area side.

According to another aspect of the invention, the cargo area is arranged in the form of modules.

The various features, variants, and/or embodiments of the present invention can be associated with one another according to various combinations, provided that they are not incompatible with one another or exclusive.

Figure 1B:
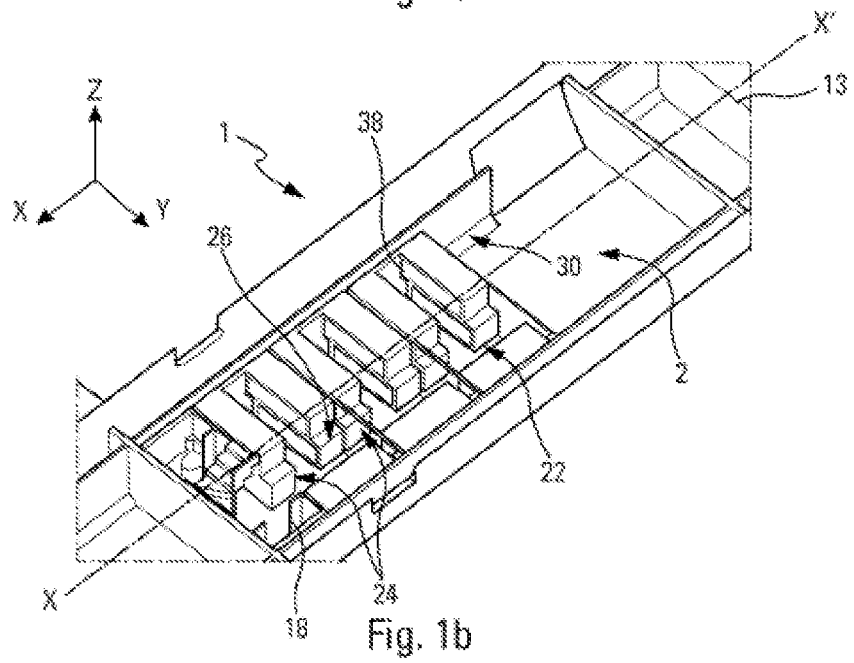
Figure 1C:
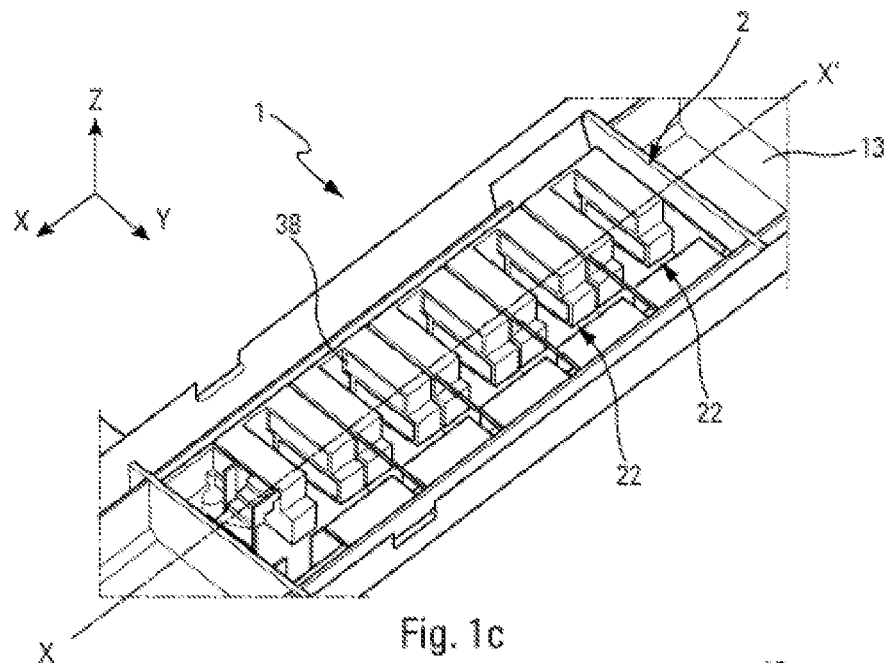
Figure 2:
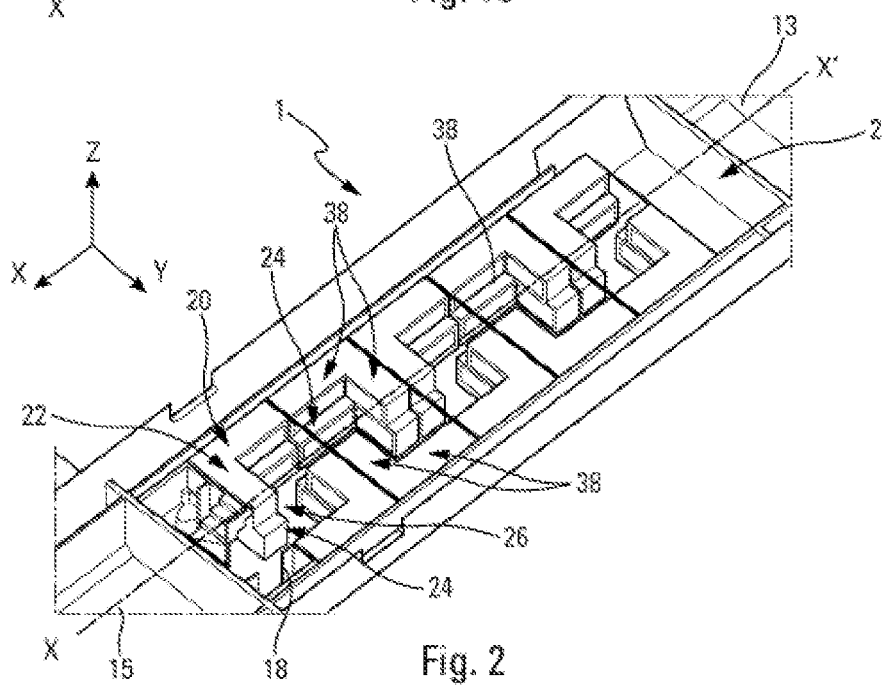
Figure 3:
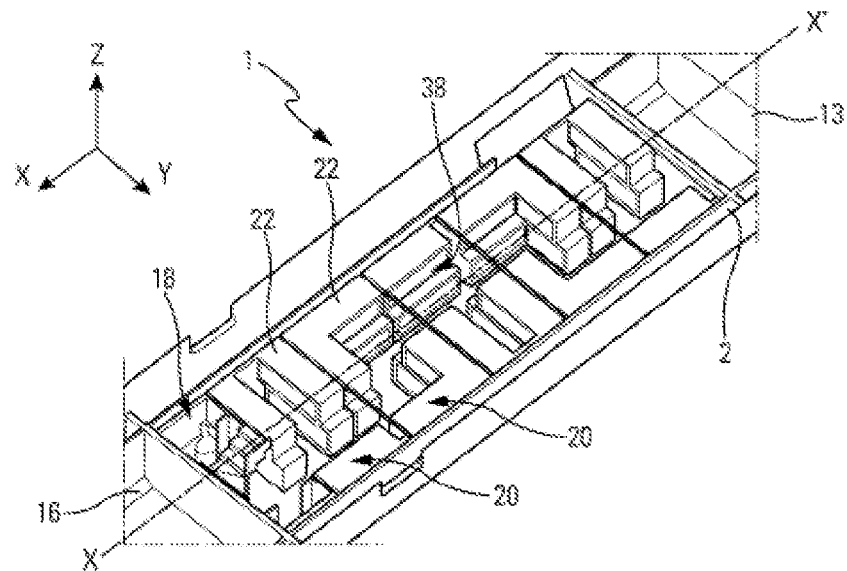
Figure 4A:
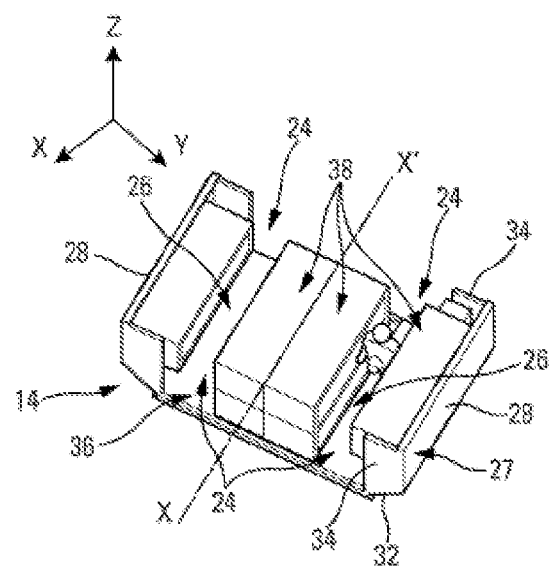
Figure 4B:
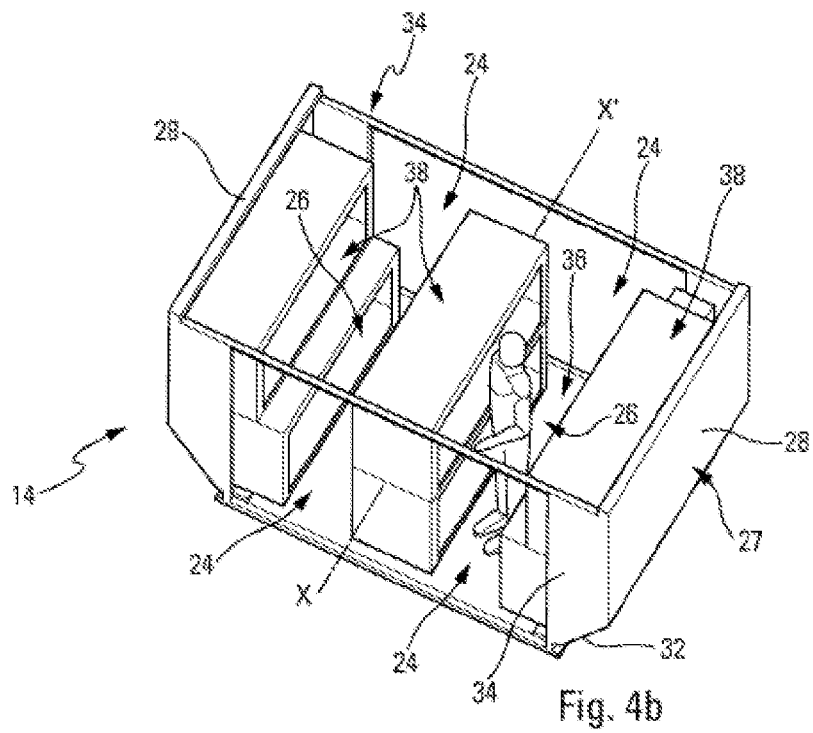
Figure 4C:
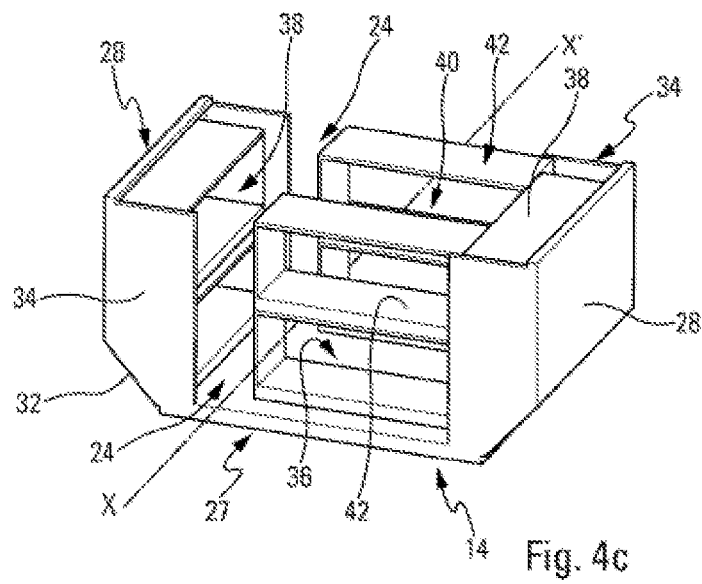
Figure 5:
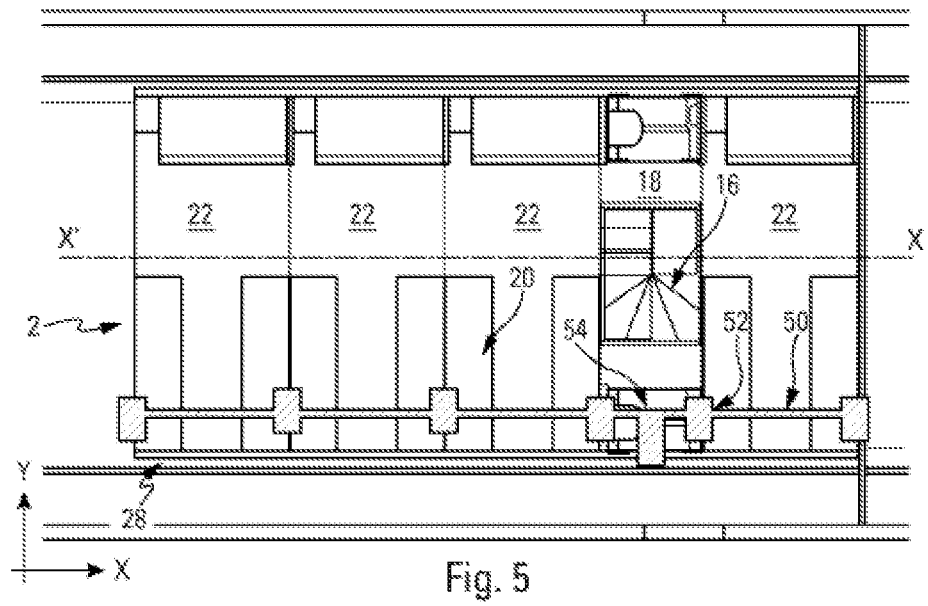
Figure 6:
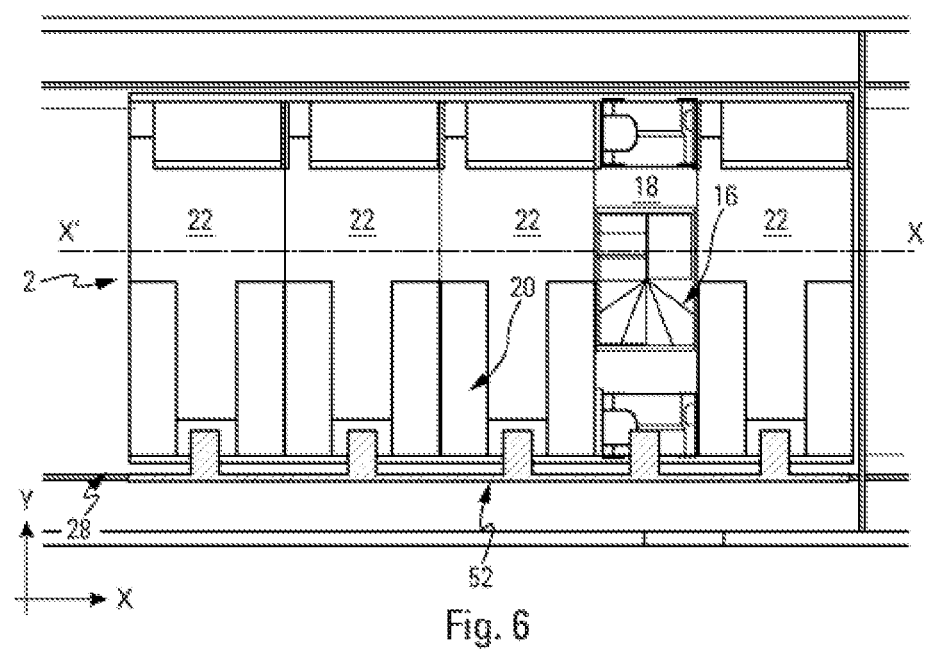
Figure 7:
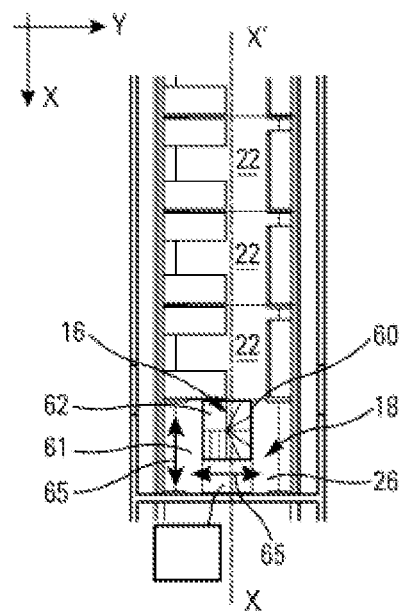
Figure 8:
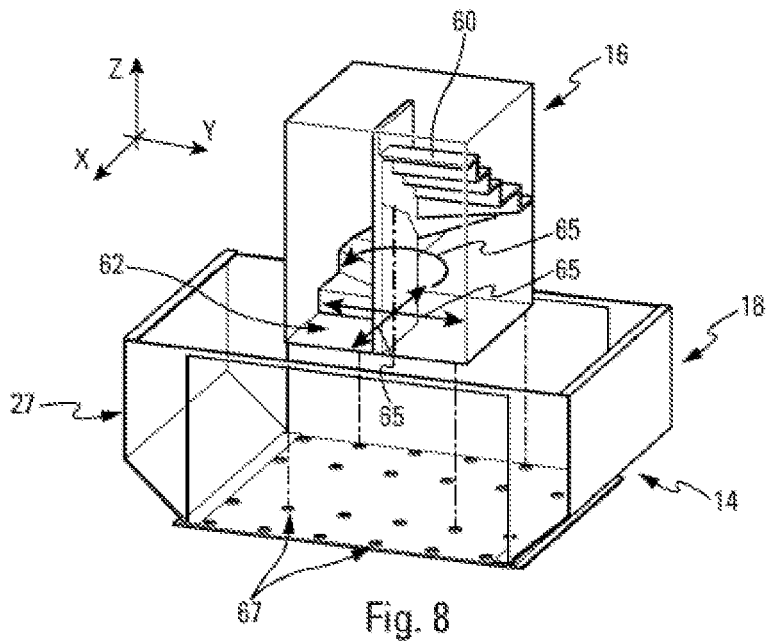
Figure 9:
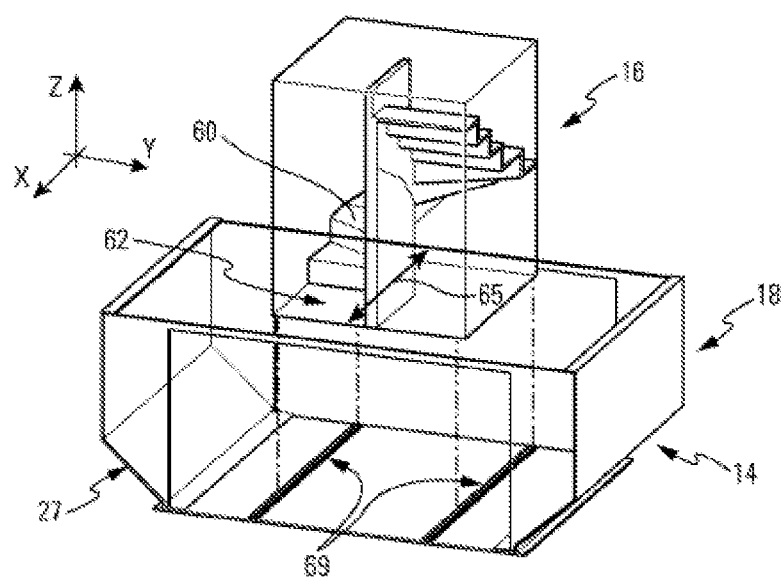
Figure 10:
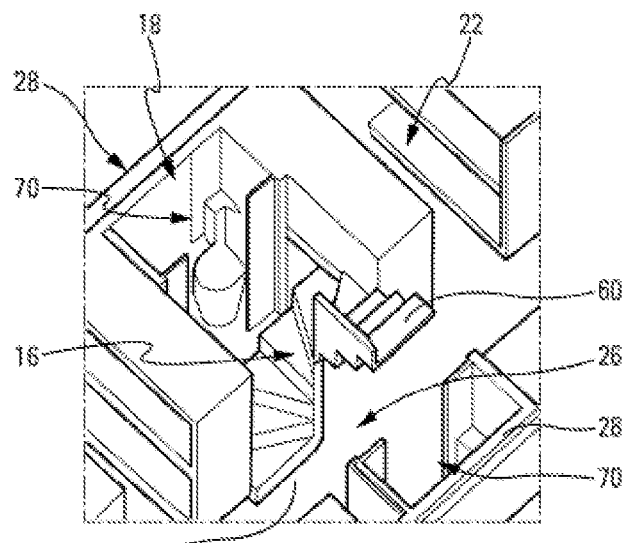
Figure 11:
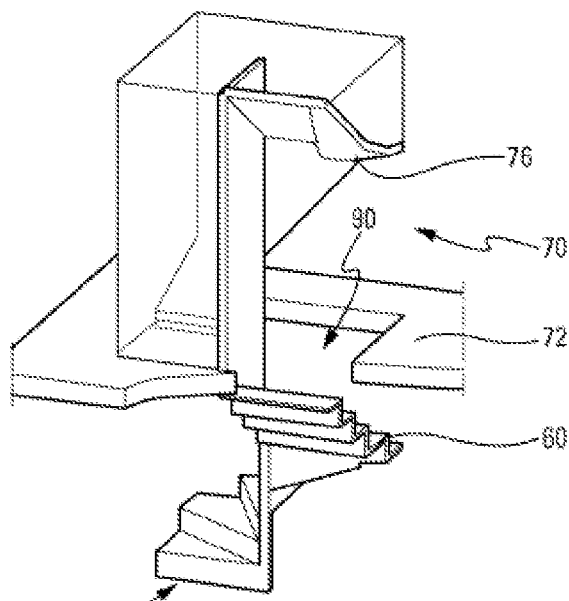
Figure 12:
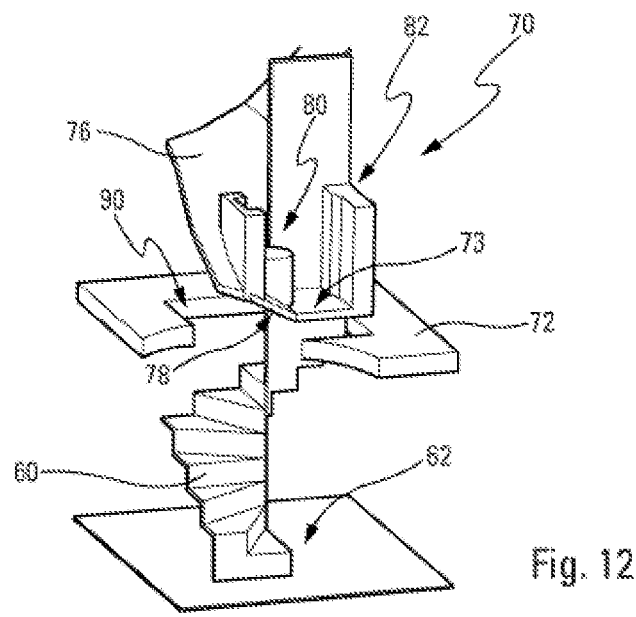
Figure 13:
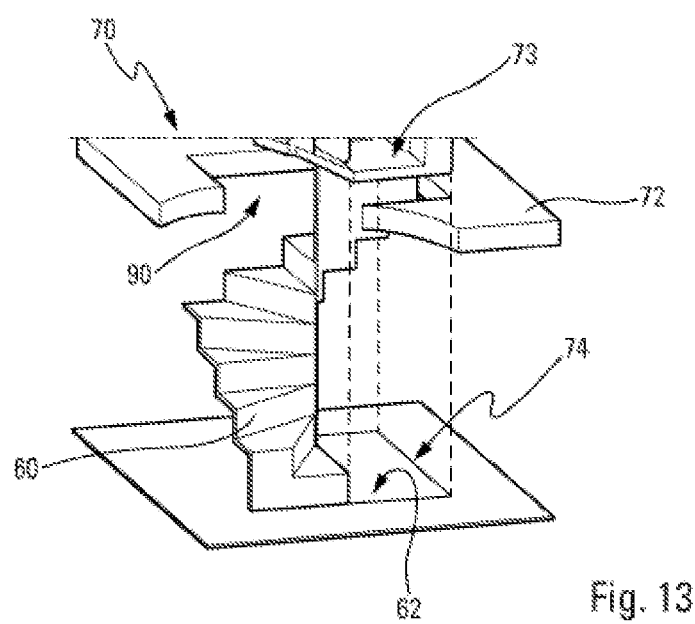
Figure 14:
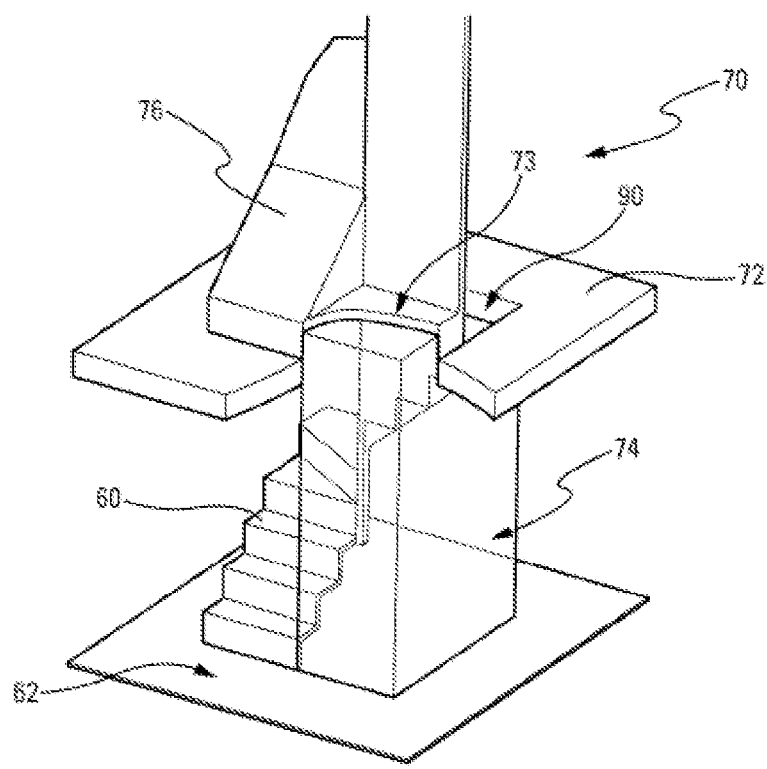

The invention will be best understood and other features and advantages will appear more clearly upon reading the following detailed description comprising embodiments provided by way of example with reference to the appended drawings, presented by way of examples and not limited thereto, which can complete the understanding of the invention and the presentation of its embodiment, and, as necessary, contribute to its definition, among which:

FIGS. 1*a* to 1*c* show a schematic and perspective view respectively of,
- a first series of modules according to the invention, corresponding to a first arrangement in the cargo area,
- a second first series of modules according to the invention, corresponding to a second arrangement in the cargo area, and
- a third series of modules according to the invention, corresponding to a third arrangement in the cargo area, FIG. 2 shows a schematic and perspective view of another series of modules according to the invention, having modules according to configurations different from those of FIGS. 1*a* to 1*c*, FIG. 3 shows a schematic and perspective view of another series of modules according to the invention, having a combination of modules such as described in FIGS. 1*a* to 1*c* and 2, FIGS. 4*a* to 4*c* show a schematic and perspective view of alternative configuration variants of a module according to the invention, FIG. 5 shows a schematic and top view of another series of modules according to the invention, so as to present a first interfacing mode between the modules and the cargo area, FIG. 6 shows a schematic and top view of another series of modules according to the invention, so as to present a second interfacing mode between the modules and the cargo area, FIG. 7 shows a schematic and top view of another series of modules according to the invention, so as to present a specificity of the access means of the access module, FIG. 8 shows a schematic and perspective view of a first variant of the access module of FIG. 6, during a mounting phase, FIG. 9 shows a schematic and perspective view of a second variant of the access module of FIG. 6, during a mounting phase, FIG. 10 shows a schematic and perspective view of a configuration of an access module according to the invention, FIG. 11 shows a schematic and perspective view of a configuration of staircase of a cabin according to a first variant of the invention, FIG. 12 shows FIG. 11 according to another viewing angle, completing that of FIG. 11, FIG. 13 shows a part of FIG. 12 to highlight the advantage provided by the variant of the invention in question, and FIG. 14 shows a schematic and perspective view of a configuration of staircase of a cabin according to a second variant of the invention.

As shown in particular in FIGS. 1*a* to 1*c*, 2 and 3, the invention also relates to a modular arrangement intended to accommodate at least one passenger of an aircraft. In the present invention, reference is generally made to one single passenger. However, it should be noted that the invention also applies to several passengers.

The modular arrangement according to the invention is advantageously intended to equip an aircraft comprising a lower deck 1 and an upper deck, defining a main cabin, not shown in FIGS. 1*a* to 1*c*, 2 and 3. The lower deck 1 comprises at least one cargo area 2. According to the present invention, the cargo area 2 is converted, in particular temporarily or definitively and/or in a reversible or irreversible manner, into cabin space. Thus, according to the embodiments of the present invention, the cargo area 2 is configurable according to various modular arrangements designed to meet the requirements and/or preferences, in particular, of an airline company, according to a flexible and modular arrangement.

According to guidelines and regulations applicable at the date of the invention, the cargo area must be clear of passengers during taxiing, take-off and landing phases. It can only be occupied outside of these specific phases. In other words, according to a possible implementation of the invention, the passengers are all seated in designated seats of the upper deck or decks 1, during taxiing, take-off and landing phases, and authorised to access the cargo area 2, as converted, outside these phases. Access to the cargo area 2, as converted, is preferably performed according to specific access conditions, for example defined upon the purchase of the ticket and/or during the flight.

The upper deck comprises, according to a specific example, two main aisles and three rows of seats, in particular to equip an aircraft intended for long-haul flights. Of course, such an arrangement is only indicative of many other possible alternative arrangements included within the scope of the invention, in particular in aircraft of which the upper deck comprises several decks, such as Boeing 747 or Airbus A380 aircraft.

According to a specific embodiment, the cargo area 2 has a configuration with limited height, for example a height of less than 2 m. In certain circumstances, the height of the cargo area can be configured to be less than 1.8 m, and even 1.6 m. The height of the cargo area is in particular measured in a central part, it being noted that the height of the cargo area in its side parts, i.e. generally arranged in the vicinity and along the sides 8 of the aircraft, can have heights that are even lower.

In the examples shown, the cargo area 2 is, preferably, delimited by side walls 4 that connect to the end walls 6 enclosing the cargo area 2. More specifically, the side walls 4 generally extend parallel with a longitudinal axis XX' of the aircraft and the end walls 6 generally extend perpendicular to the longitudinal axis XX' of the aircraft. Preferably, the side walls 4 extend parallel with a plane XZ of a coordinate system XYZ comprising the longitudinal axis XX' of the aircraft as axis X and the end walls 6 extend parallel with a plane YZ of the coordinate system XYZ.

The cargo area 2 is between the sides 8 of the aircraft. Because of the curved geometry of the sides 8 of the aircraft, residual space is present between the side walls 4 of the cargo area 2 and the sides 8 of the aircraft. In a particularly advantageous embodiment, the present invention comprises side walls 4 of the cargo area 2 that tend to reduce to a minimum the residual space present between the side walls 4 of the cargo area 2 and the sides 8 of the aircraft. For this purpose, the side walls 4 can have a profile having several vertical sections connected by linking sections, for example, oblique.

In order to enable the loading of loads and/or goods intended to be stored in the cargo area 2 of the aircraft, an access opening 10 of the cargo area 2 is provided on at least one of the side walls 4 of the cargo area 2. The access opening 10 is preferably located at the level of one of the side walls 4 of the cargo area 2 and opposite an access door 12, termed "cargo door 12" provided on one of the sides 8 of the aircraft. Without departing from the scope of the invention, the equipped aircraft can comprise several cargo areas, possibly divided into compartments such as that shown 13 in FIGS. 1a to 1c, 2 and 3.

The modular arrangement according to the invention can further comprise a least one first modular element 18, termed "access module 18" and/or at least one second modular element 22, termed "comfort module 22". Preferably, the first modular element 18, and respectively the second modular element 22, can comprise a structural element 14, in particular a frame 14, contributing to defining a structural shell of the first modular element 18, and respectively of the second modular element 22. More specifically, the structural element 14 is configured to be mounted, placed or arranged, preferably in a removable and reversible manner, in the cargo area 2 of the aircraft.

More specifically, the first modular element 18 or access module 18 advantageously comprises an access means 16 from the upper deck of the aircraft to allow access from the upper deck of the aircraft to the access module 18. Moreover, the second modular element 22 or comfort module 22 advantageously comprises at least one comfort device 20 improving the comfort of the passenger present in the comfort module 22. In particular, the term "comfort device" describes a means enabling the passenger to rest in a partially or fully seated position and/or in a partially or fully reclined position.

According to an alternative embodiment of the present invention, the access module 18 does not comprise a comfort module 20 and/or the comfort module 22 does not comprise an access means 16. According to other specific embodiments, the access module 18 can also advantageously comprise at least one comfort device 20.

The access means 16 is arranged in or on the structural element 14, in particular the frame 14. In addition, the access module 18 is configured to enable the upper deck to communicate with at least one space external to the access module 18 and located in the cargo area 2, for example a comfort module 22. According to a specific embodiment, the access module 18 is, moreover, located opposite one of the end walls 6 of the cargo area 2, advantageously arranged adjacent to one of the end walls 6 of the cargo area 2.

The modules 18, 22, in particular the access module 18, can comprise a lower part and an upper part forming a ceiling for the lower part. The ceiling is advantageously independent from and secured to the lower part. Various ceilings can therefore be adapted to a single lower part, in particular to ensure the proper positioning of the access module with respect to an access hatch provided in the upper deck and affording access to the modules 18, 22. Indeed, the relative positioning of the access hatch and of the access module 18 can vary from one aircraft to the other. It is indeed possible to place the access module in its intended location under the access hatch, while also optimising the volume of the cargo area, for example by positioning the access module against an end wall of the cargo area, rather than losing surface area in the cargo area.

The ceiling comprises a housing providing access to the inside of the module, such a housing being intended to be provided opposite the access hatch provided in a floor of the upper deck of the aircraft. Said housing has, for example, a shape that is substantially similar to the form of the access hatch. In a variant, the housing is bigger than the access hatch. In yet another variant, the module is fully open in its top part.

Preferably, said access module comprises a lining that conceals, and even seals, an interface zone between the ceiling of the module and the floor of the upper deck, at the level of an edge of the housing and/or of the access hatch.

The comfort device 20 is arranged in or on the structural element 14, in particular the frame 14. Furthermore, the comfort module 22 is configured to communicate with at least one space external to the comfort module 22 and located in the cargo area 2, for example another comfort module 22 and/or an access module 18. According to an embodiment shown in the figures, the comfort module 22 is arranged:

between an access module 18 and another comfort module 22, or
between two other comfort modules 22, or
between another comfort module 22 and the rest of the cargo area 2.

According to another embodiment, the comfort module 22 can be arranged:

between an access module 18 and one of the end walls 6 of the cargo area 2, or
between another comfort module 22 and one of the end walls 6 of the cargo area 2.

In the specific configuration wherein the comfort module 22 opens onto the rest of the cargo area 2, the access to the rest of the cargo area preferably remains closed.

The comfort module 22 is therefore preferably configured to enable communication between two spaces external to said comfort module 22, even if each of said communication means is not necessarily used.

Thanks to such a configuration in modular elements or modules, in particular specific-purpose modules, i.e. in particular the access module 18 and the comfort module 22, it is possible to equip the cargo area 2 in a manner adapted to specific needs, according to a modular arrangement that can be arranged to suit multiple configurations. Furthermore, the preparation of the cargo area 2 according to the present invention is possible in a fast and reversible manner.

In particular, each module, respectively the first modular element 18 or access module 18 and/or the second modular element 22 or comfort module 22, is configured to communicate with a module arranged in a contiguous manner in the cargo area 2 of the aircraft, also termed neighbouring module.

Such as shown in FIG. 1a, the cargo area 2 accommodates a succession and/or stack of modules formed of one access module 18 and two comfort modules 22. In the embodiment shown in FIG. 1b, the cargo area 2 is completely filled with an additional comfort module 22. Finally, in the embodiment of FIG. 1c, two other additional comfort modules 22 are arranged in the cargo area 2 such that nearly the entire volume of the cargo area 2 is filled. The comfort modules shown in these figures define resting areas and the comfort devices 20 they comprise are configured for that purpose.

In a variant (not shown), all, one of, or more of the modules, in particular the comfort module or modules 22, or more thereof, can be configured for other uses than that of a resting area, in particular to define meeting rooms, hospitality areas, sales areas such as a shop, and/or leisure areas such as a bar or a casino.

In particular, at least one of these modules can comprise one or more meeting rooms. These meeting rooms are preferably closed. They can also be used as privacy areas for people who want to be secluded from the rest of the space defined by the modules provided in the cargo area 2. They are configured, for example, to accommodate two to three passengers. They advantageously comprise a telephone and/or videoconferencing system.

Such a module can comprise inner partitions for example oriented along the longitudinal axis of the aircraft and/or perpendicular to the longitudinal axis of the aircraft, the inner partitions compartmentalising the module into independent spaces, delimiting at least partially said meeting rooms. These inner partitions can be removed and/or retracted. They can also be used to compartmentalise the module for uses other than that of meeting rooms.

In a variant, one of the modules or more of the modules, in this case positioned in a succession, define a said hospitality area, a said sales area and/or a said leisure area.

A succession/stack of modules (not shown) is, for example, formed of an access module, a comfort module intended to accommodate passengers and one or more comfort modules configured to serve as a resting area.

In another variant, one of the comfort modules can define a sanitary module, i.e. a module comprising one or more toilets. In other words, the module only comprises toilets or possibly service areas, without comfort devices 20 or access means 16.

Advantageously, each module according to the invention, i.e. the access module 18 and/or the comfort module 22, is configured to be arranged side-by-side with a neighbouring module along the longitudinal axis XX' of the aircraft. Therefore, the longitudinal axis XX' of the aircraft defines a "longitudinal direction of the module". In other words, each module is configured to be contiguous with another module, and even to be sandwiched between two other modules, in the longitudinal direction of the modules. According to such arrangements, several series of modules stacked horizontally along the longitudinal axis XX' of the aircraft are arranged in the cargo area 2, to convert it into a cabin space.

According to a specific embodiment of the present invention, each modular element or module is configured to extend over a full width of the cargo area 2. In the present context, the width of the cargo area extends along an axis Z of the system of coordinates XYZ. Thus, the part of the cargo area 2 that can be left vacant for the transport of goods is located in the extension, along the longitudinal axis XX' of the aircraft, or of the last module or modules of the series of modules formed in the cargo area 2.

Preferably, each module, i.e. the access module 18 and/or the comfort module 22, is configured to be loaded into the cargo area 2 through one of the sides 8 of the aircraft, in particular, through the access door 12, or cargo door 12, of the aircraft and through the access opening 10 of the cargo area 2. Each module is also configured to be moved along the longitudinal direction of the module during the installation thereof, so as to facilitate the abovementioned horizontal stacking of the modules. Thus, a first of the modules is loaded through the access door 12 and the access opening 10. Then, the first of the modules is brought to the intended position thereof within the cargo area 2. The same operation is repeated for each successive module, following the order of modules required to achieve the desired configuration of modules in order to convert the cargo area 2 into a specific cabin area.

Each module, i.e. the access module 18 and/or the comfort module 22 comprises, for example, at least one first passage 24, advantageously at least one second passage 24, configured to communicate with at least one module arranged immediately before and/or after it along the longitudinal axis XX' of the aircraft in the desired configuration of modules. Advantageously, when the module, i.e. the access module 18 and/or the comfort module 22, comprises at least one first passage 24 and at least one second passage 24, the first passage 24 and the second passage 24 are arranged so as to enable communication of the module with the module arranged immediately before and the module arranged immediately after it along the longitudinal axis XX' of the aircraft in the desired configuration of modules.

According to various embodiments shown, each module comprises two passages 24, one of the passages 24 located at an end of the series of modules being sealed, closed or intended to be closed. Preferably, the first passage 24 and the second passage 24 are located at the level of opposite faces of each of the modules along the longitudinal direction of the module.

Advantageously, the module comprises, for example, a main aisle 26 connecting the first passage 24 to the second passage 24. According to various configurations and arrangements of the first passage 24 and of the second passage 24, the main aisle 26 can have a rectilinear orientation or a curved orientation having at least one inflexion.

According to a first configuration of the module, corresponding to FIGS. 1a to 1c, the first passage 24 and the second passage 24 are located in the extension of one another along the longitudinal direction of the module, and the main aisle 26 is rectilinear. Said figures also show an example of an embodiment of the present invention wherein an access means 18 is combined with several identical comfort modules 22, i.e. two comfort modules 22 according to the example of FIG. 1a, three comfort modules 22 according to the example of FIG. 1b and five comfort modules 22 according to the example of FIG. 1c.

According to another configuration of the module, in particular applicable to the comfort modules 22, corresponding to FIG. 2, the first passage 24 and the second passage 24 are laterally offset from the longitudinal axis XX' of the aircraft and the main aisle along the longitudinal axis XX' of the aircraft is S-shaped.

In the example of the configuration of the cargo area 2 according to FIG. 2, the comfort modules 22 are different in pairs, meaning that two adjacent comfort modules are not identical. According to a specific embodiment, two adjacent comfort modules 22 are arranged symmetrically with respect to one another, as a mirror image.

In FIG. 3, the comfort modules 22, according to the preceding configurations described in relation to FIGS. 1a to 1c and 2, are combined and arranged in an alternating manner.

The FIGS. 2 and 3 show examples wherein the comfort modules 22 are of different types. Ideally, the different variants of the comfort modules 22 are limited, defining the standards of comfort modules 22. Thus, the various comfort modules 22 are selected from a limited number of standard comfort modules 22. The term "different type" is used, in particular, to describe the fact that the number and/or spatial distribution of the comfort devices 20 inside the comfort module 22 are different.

It has been explained above that, preferably, the various modules, i.e. a combination of at least one access module 18 and/or at least one comfort module 22 are positioned in succession along the longitudinal axis XX' of the aircraft. Advantageously, one of the modules is an access module 18 and one of the other modules is a comfort module 18.

The access module 18 is, according to the embodiment alternatives shown above, positioned at a longitudinal end along the longitudinal axis XX' of the series of modules. In a variant, the access module 18 can be located between the two comfort modules 22. For the modules located at the end of a series, the first passage 24 and/or the second passage 24 do not open into another module and are sealed off or closed.

Preferably, the main aisles 26 are located in the extension of one another so as to form a continuous main aisle along the series of modules. In FIGS. 1a to 1c, the main aisle 26 formed by the series of modules is rectilinear along the longitudinal axis XX' over the entire length of the series of modules. In FIG. 2, with the exception of the access module 18, the main aisle 26 formed by the series of modules results in the main aisle 26 being S-shaped, the S-shaped main aisles being arranged as a mirror image along the series of modules. In FIG. 3, the main aisle 26 formed by the series of modules combines rectilinear portions and S-shaped mirrored portions. Thus, the modules communicate with one another, such that the passenger can go from one module to the next along the series of modules.

As is better seen in FIGS. 4a to 4c, the structural element 14 of the module comprises, for example, a box 27 configured to be loaded into the aircraft in a removable manner and comprising side faces 28. According to an alternative embodiment, the side faces 28 of the box 27 are configured to engage with longitudinal guides 30 (visible in FIGS. 1a and 1b) arranged in the cargo area 2. According to a specific example, the longitudinal guides 30 are located at the foot of the side walls 4 of the cargo area 2. The longitudinal guides 30 in particular ensure the proper positioning of the module inside the cargo area 2.

By way of example, at least one of the side faces 28 of the box 27 can comprise, as shown in FIGS. 4a to 4c, at least one cut panel 32, in particular oriented at 45°. According to a specific embodiment, the cut panel 32 is intended to slide parallel with and on the longitudinal guides 30 of the cargo area 2. As shown, the box 27 comprises two cut panels 32 arranged on each of the side faces 28 of the box 27 extending along the longitudinal axis XX' of the aircraft, preferably parallel with the side walls 4 of the cargo area 2.

In addition, the cut panels 32 decrease the residual space present between the side walls 4 of the cargo area 2 and the sides 8 of the aircraft. Such a geometric configuration provides optimal volume in the module such that the latter can be conformed according to specific needs into an access module 18 and/or into a comfort module 22.

The box 27 further comprises end faces 34, also termed "stacking faces 34", configured to be arranged opposite the corresponding end faces 34 of the adjacent module, arranged in an end position in the cargo area. The end faces 34 are arranged perpendicular to the longitudinal axis of the module. The end faces 34 join the side faces 28 of the box 27 in order to define, together with the structural element, the structural shell of the module. In other words, in such an embodiment variant, two adjacent modules 18, 22 thus formed have a double wall thickness separating them.

In a variant, the box 27 comprises an end face 34 and an opposite open end side so that two adjacent modules 18, 22 thus formed are separated by a single wall thickness, by bringing the open side of the one in contact with the end face of the other.

In yet another variant, the box 27 comprises two open end sides so that two adjacent modules 18, 22 have no wall thickness separating them.

However, the modules can comprise stringers connecting their side faces to reinforce their rigidity, the positioning of the stringers being possibly changeable to prevent them from blocking the access hatch in the case of stringers equipping an access module.

In addition, in an embodiment variant, the box 27 can also comprise a base 36 and/or an upper face, not shown in FIGS. 4a to 4c to make the interior of the box 27 visible. The base 36 and/or the upper face extend from lower segments, respectively from the upper segments, of the side faces 28 and/or the end faces 34 of the box 27. The base 36 of the box 27 is advantageously covered by the floor of the module. The upper face 36, when present, forms the ceiling of the module. The first passage 24 and/or the second passage 24 of the module are formed, for example, by openings provided in the end faces 34 of the box 27.

Preferably, the box 27 comprises attachment means maintaining the box 27 in position inside the cargo area. The attachment means constitute mooring or anchoring points of the box 27 to the side walls 4 and/or to the floor of the cargo area 2.

With reference to FIGS. 1a to 1c, 2, 3, and 4a to 4c, it should be noted that the comfort device 20 comprises, for example, at least one sleeping unit 38. According to one specific configuration, at least one first sleeping unit 38 is, in particular, arranged parallel with the main aisle 26. In an alternative or complementary manner, at least one second sleeping unit 38 is, in particular, arranged perpendicular to the main aisle 26. The sleeping units are, for example, located on either side of the main aisle 26.

According to other configurations, the sleeping unit 38 can comprise several berths superposed on top of one another, along the axis Z of the system of coordinates XYZ.

As can be seen in the figures, by way of example, the berths located at the base 36 of the box 27 can be offset with respect to the ones located on top of them because of the presence of the cut panel 32, the berths being offset longitudinally or laterally depending on their orientation.

According to the configurations shown in FIGS. 1a to 1c, the first sleeping unit 38 can comprise at least two superposed berths extending from one end face 34 of the box 27 to the other, between the main aisle 26 and one of the side faces 28 of the box 27.

In addition, the module further comprises a corridor 40 extending from the main aisle 26. In the example shown, the corridor 40 extends parallel with the end faces 34 of the box 27. In such a configuration, the main aisle 26 and the corridor 40 together form a "T".

The second sleeping unit 38 comprises two series of at least two superposed berths extending from the main aisle 26 to one of the side faces 28 of the box 27 between the corridor 40 and each of the end faces 34 of the box 27.

According to the configuration shown in FIG. 2, a first sleeping unit 38, that can comprise at least two superposed berths, extends, along the longitudinal axis of the module, from one of the end faces 34 of the box 27, between the main aisle 26 and one of the side faces 28 of the box 27. A second sleeping unit 38, that can comprise at least two superposed berths, extends perpendicular to the first sleeping unit 38, from the same side face 28 of the box 27 to the main aisle 26, along the other end face 34 of the box 27. The first sleeping unit 38 and the second sleeping unit 38, when thus arranged, form an "L" located at the corner of the module. Another combination of a first sleeping unit 38 and of a second sleeping unit 38 forming an "L" is arranged according to a central symmetry of the module at another corner of the module. This arrangement thus offers eight berths located on either side of the main aisle 26.

According to the configuration shown in FIG. 4a, the module comprises two main aisles 26 parallel with one another and parallel with the longitudinal axis of the module. It comprises four passages 24 corresponding to each main aisle 26. In such a configuration, four first sleeping units 38, that can comprise at least two superposed berths, extend along the longitudinal axis of the module between the end faces 34 of the box 27. Two first sleeping units 38, termed "central", are arranged between the main aisles 26. Two first sleeping units 38, termed "lateral", can comprise at least two superposed berths and extend parallel with the first sleeping units 38, termed "central", along the side faces 28 of the box 27, in particular on top of their cut panel 32. The first sleeping units 38, termed "lateral", are respectively arranged between one of the main aisles 26 and the side face 28 of the box 27, in the vicinity of the considered main aisle 26.

In a similar manner, according to the configuration shown in FIG. 4b, the module comprises two main aisles 26 parallel with one another and parallel with the longitudinal axis of the module. It comprises four passages 24 corresponding to each main aisle 26. In such a configuration, four first sleeping units 38, that can comprise at least two superposed berths, extend along the longitudinal axis of the module between the end faces 34 of the box 27. Two first sleeping units 38, termed "central", can comprise at least two superposed berths and are arranged between the main aisles 26. Two first sleeping units 38, termed "lateral", can comprise at least two superposed berths and extend parallel with the first sleeping units 38, termed "central", along the side faces 28 of the box 27. The first sleeping units 38, termed "lateral", are respectively arranged between one of the main aisles 26 and the side face 28 of the box 27, in the vicinity of the considered main aisle 26. In this specific configuration, the berths located at the base 36 of the box 27 can be offset laterally, along a direction perpendicular to the longitudinal axis of the module, with respect to the berths located on top of them, owing to the presence of the cut panel 32.

According to the configuration shown in FIG. 4c, the module comprises a main aisle 26 parallel with the longitudinal axis of the module and a corridor 40 extending from the main aisle 26 along a direction perpendicular to the longitudinal axis of the module. The main aisle 26 and the corridor 40 are arranged to form a "T", as seen in the configuration of the modules of FIGS. 1a to 1c. Two first sleeping units 38, termed "lateral", can comprise at least two superposed berths and can extend along the side faces 28 of the box 27, in a manner similar to the configuration of the module of FIG. 4a. According to the embodiment of FIG. 4c, the module further comprises at least one add-on unit 42 located between the corridor 40 and at least one of the end faces 34 of the box 27. By way of example, the add-on unit 42 can be a second sleeping unit 38 and comprise at least two superposed berths, extending perpendicular to the longitudinal axis of the module from the first sleeping unit 38. Alternatively, the add-on unit 42 can be used in various other manners, to provide storage space, a work space, or leisure spaces.

In a variant of each of the preceding configurations, instead of sleeping units provided with superposed berths, it is possible to have sleeping units comprising a single berth.

Although this aspect is not shown, at least one of the end faces 34 can comprise a retractable part in order to form sleeping units 38 with double superposed berths from a single sleeping unit 38 extending along the end faces 34, opposite two adjacent comfort modules 22.

The box 27 has, for example, a dimension along the longitudinal direction of the module ranging from 150 to 240 cm. More specifically, the dimension along the longitudinal direction of the module can be equal to 153 cm or 220 cm or 240 cm.

The passages 24 of the modules are defined, for example, by partitions of the box 27 and/or by ends of the sleeping units 38 located in the vicinity of the end faces 34 of the box 27.

Advantageously, although this aspect is not shown, the module comprises one or more storage compartments, in particular for valuables such as handbags, laptops or other items. Indeed, passengers might want to keep such items on their persons rather than leaving them in the storage spaces associated with their allocated seats on the upper deck or decks. More voluminous items, such as carry-on bags and suitcases, can be left in the storage spaces of the upper deck or decks.

The storage compartments are integrated, for example, with the sleeping units and/or located close to the sleeping units. In particular, these can be provided as safes. They are located at the head or at the foot of a berth. They can also, in an alternative or complementary manner, be located along and/or underneath the berth. They can in particular be provided under the berth if the module has a lowered floor (and even further on).

According to a specific aspect, they are configured to hold a jacket and/or a coat suspended on a coat hook provided in the storage compartments.

The modules can also comprise shelves, in particular located at the head and/or foot of the berth, or tables, in particular located in the meeting rooms.

The different elements used to equip the modules, in particular the berths, storage compartments, shelves and/or tables, can be removable. In that case, the modules advantageously comprise for that purpose attachment points for said equipment. These various elements used to equip the modules can also, alternatively or cumulatively, be of adjustable height.

As shown in FIGS. 5 and 6, each module, i.e. the access module 18 and/or the comfort module 22, comprises at least one internal network 50 of the module to transport power, in particular electrical power, to transmit data and/or for the distribution of fluids, in particular air-conditioning and/or water. Each module further comprises a connection interface 52 for the connection of the internal network 50 of the module to at least one network external to the module, in particular a specific network of the aircraft dedicated to the transport of power, in particular electrical power, to the transmission of data and/or to the distribution of fluids, in particular air-conditioning and/or water.

According to the embodiment of FIG. 5, the connection interface 52 of the module is configured to engage with at least one connection interface 52 of the neighbouring module. For this purpose, the connection interface 52 of the module is advantageously located, for example, at the level of the end faces 34 of the module, so as to be positioned opposite a neighbouring module. The internal network 50 then extends, for example, along one of the side faces 28 of the module. In particular, the internal network 50 can, in part or in full, be arranged at the level of the cut panel 32. However, the internal network 50 can comprise branches arranged in the module for the distribution of power, data and/or fluids, at the desired location inside the module, for example in the vicinity of the sleeping units 38.

According to an alternative embodiment, the arrangement of the modules according to the present invention comprises a centralised connection interface 54. By way of example, the centralised connection interface 54 can be arranged at the level of the access module 18. The centralised connection interface 54 defines one single connection point between the network of the modular arrangement, made of various internal networks 50 interconnected with one another, and the specific networks of the aircraft dedicated to the transport of power, in particular electrical power, the transmission of data and/or the distribution of fluids, in particular air-conditioning and/or water. According to the embodiment of FIG. 6, the connection interfaces 52 of each module are configured to engage unitarily with the cargo area 2. The connection interfaces 52 are located, for example, on one of the side faces 28 of the box 27. The embodiments of FIGS. 5 and 6 can also be combined.

In a variant (not shown), one of the modules, in particular the comfort module, can form a functional module, i.e. a module configured to communicate with at least one space external to the module, located in the cargo area, so as to supply the cargo area, and in particular to supply other modules located in the cargo area, with power, in particular electrical power, with data, in particular with digital data, and/or with fluids. The functional module is advantageously configured to be connected to one or more on-board systems of the aircraft. According to such a variant, the centralised interface 54 is located at the level of the functional module. Such a module is advantageously located at one of the ends of the succession/stack of modules.

Reference is now made to FIGS. 7 to 9, wherein the access means 16 of the access module 18 comprises, for example, a staircase 60. The staircase 60 opens onto a landing 62 of the access module 18 connecting directly or indirectly with the main aisle 26 of the module. In the embodiment shown, the staircase 60 forms a half-turn. It connects to the main aisle 26 by means of an access corridor linking the staircase 60 to the main aisle 26. According to the embodiment of FIG. 6, the access corridor is L-shaped, comprising a first aisle 61 and a second aisle 63 from the landing 62 to the main aisle 26. In a variant, the staircase 60 can be straight or form a quarter-turn. Alternatively, the access means 16 can comprise a ladder.

Advantageously, the structural element 14, and in particular the box 27, are configured to enable attachment of the staircase 60 according to various predetermined configurations, in particular various predetermined orientations and/or positions, as is symbolised by the arrows 65. The module can therefore easily be adapted to the positioning requirements inside the cargo area 2, converted according to the present invention into cabin space, with respect to an access opening provided in a floor of the upper deck to communicate with the cargo area 2. The modularity of the orientations and/or positions is in particular required to ensure that the modular arrangement according to the present invention is applicable in all or part of existing aircraft and/or is implemented regardless of the configurations of the cargo area 2, wherein the modular arrangement is arranged.

To this end, the box 27 comprises anchoring means for the staircase 60. The anchoring means for the staircase 60 are preferably evenly distributed at the base 36 and/or on the floor of the box 27. In FIG. 8, the anchoring means are in particular anchoring points 67 enabling a variable positioning of the staircase longitudinally and/or transversally. In addition, advantageously, the anchoring means also enable a variable angular orientation.

In an alternative and/or complementary manner, as shown in FIG. 9, the anchoring means are in particular rails 69. In the figure, the rails 69 are arranged parallel with the longitudinal axis of the aircraft. In an alternative variant (not shown), they are arranged perpendicular to this axis. The positioning of the staircase 60 with respect to the access hatch can then be carried out, along the longitudinal axis of the aircraft, through the positioning of the access module 18 in the cargo area 2 and, perpendicular to said axis, thanks to the rails 69.

As shown in FIG. 10, the access module 18 also comprises at least one comfort device 20, for example, toilets 70 and/or a service area 70. For example, the toilets 70 and/or a service area 70 are likely to be intended for one or more members of the cabin crew or passengers. By way of example, the toilets 70 and/or the service area 70 are located on either side of the staircase 60. In particular, the toilets 70 and/or the service area 70 are arranged along the side faces 28 of the box 27 of the module.

The toilets 70, regardless of whether they are located at the level of the or one of the access modules 18 and/or at the level of one of the comfort modules 22, in particular in the sanitary module if present, are, for example, connected to a tank for the collection of human waste and separate from the sceptic tank of the aircraft. This can be a tank configured to carry out a chemical treatment of the waste.

In another variant, the access module 18 does not comprise toilets, and even none of the modules 18, 20 equipping the cargo area 2 comprise toilets, the latter only being provided on the upper deck or decks.

Although this aspect is not shown, to facilitate the upright position, the cargo area 2 can have a lowered floor, at least at the level of the module or modules 18, 22, and the module or modules can have a floor that fits with the shape of the floor of the cargo area. The floor of the module can in particular be mobile to fit with the floor of the cargo area in a lowered position and to be raised into other positions.

As detailed in the following description, in a specific arrangement configuration of the cargo area 2, the upper face of the module, when present, can comprise a localised recess, in particular at the level of the landing 62 of the access module.

Complementary embodiments are shown in FIGS. 11 to 14, wherein the upper deck 70 has a floor 72 wherein is provided an access hatch or opening 90 at the level of the staircase 60.

According to a specific embodiment, the upper deck 70 comprises locally a raised floor 73. Because of such an arrangement, the raised floor 73 provide, at least locally, a part of the cargo area 2 with a ceiling height that is greater than the ceiling height of the rest of the cargo area 2. An area 74, corresponding to an edge of the raised floor 73 projected onto the floor of the box 27, defines a space of the box 27 wherein the ceiling height, at least locally, of the cargo area 2 is greater than the ceiling height of the rest of the cargo area 2. The area 74 is, in particular, shown in FIG. 13, where it is vertically delimited by a dotted line, and in FIG. 14, where it is greyed out. In the area 74, the upright position is facilitated, which is particularly advantageous considering the reduced ceiling height that the rest of the cargo area 2 is likely to present.

Advantageously, the raised floor 73 is located in the vicinity of the access means 16. More specifically, the raised floor 73 is located, in particular, on top of the access opening 90 provided in the floor 72 of the upper deck 70 for the passage of the access means 16. Alternatively, the raised floor 73 is located, in particular, at the periphery of the access opening 90. Such configurations of the raised floor 73 are provided such that the access opening 90 is possibly widened beyond what is strictly necessary for the passage of the access means 16.

In addition, the upper deck 70 comprises an inclined partition 76 forming, at least partially, a ceiling keeping a relatively constant ceiling height above the access means 16, in particular of each step or flight of steps of the staircase 60. In the variant of FIGS. 11 to 13, the raised floor 73 of the upper deck 70 is located at the level of the landing 62 of the access module 18. As is more particularly visible in FIG. 12, a first portion 78 of the inclined partition 76 is horizontally extended by the raised floor 73.

According to one embodiment, the upper deck 70 comprises toilets 80 located opposite the first portion 78 of the inclined partition 76. In a variant, it can serve as a service area or a wash-stand. More specifically, the presented configuration is such that the upper deck 70 comprises a wash-stand 82 arranged opposite the first portion 78 of the inclined partition 76 with respect to the raised floor 73. Thus, the raised floor 73 forms a part of the floor 72 of the upper deck 70 supporting the toilets 80 and the wash-stand 82 In particular, it must be noted that the embodiment of FIG. 12 comprises a staircase 60 forming a half-turn.

According to the variant of FIG. 14, the raised floor 73 is located at the level of a surface of the cargo area 2 located in the vicinity of the last steps of the staircase, on the cargo area side 12, in a lateral extension of the steps. The area 74 enabling the upright position of a passenger in the cargo area 2 is therefore no longer at the level of the landing 62, but next to the staircase 60. Such an area 7' is all the more advantageous as it is located underneath an area that is hard to use from the upper deck 70. The raised floor 73 is, in this case, independent from the inclined partition 76. In particular, it must be noted that the embodiment of FIG. 13 comprises a staircase forming a quarter-turn.

The raised floor 73 is offset above the floor 72 of the upper deck 70 by a height ranging from 5 cm to 25 cm, in particular from 10 cm to 20 cm, and more specifically from 10 cm to 16 cm. These dimensions provide significantly increased ceiling height in the corresponding part of the cargo area 2, while also forming a step that is easy to step over by a passenger circulating on the upper deck 70.

Preferably, the upper deck comprises partitions surrounding the hatch and/or the access opening 90, with the exception of the side through which the staircase 60 is accessed. These partitions are provided to make the circulation of passengers and crew members safer. They can be, in particular, the partitions of a separation space between two areas of the upper deck, in particular two areas belonging to different travel classes.

Of course, the invention is not limited to the embodiments described above and provided solely by way of examples. It includes various modifications, alternative forms and other variant that a person skilled in the art can consider within the scope of the present invention, and in particular all the combinations of the various operating modes described above, these modes being taken individually or in combination.

The invention claimed is:

1. An aircraft cabin comprising
an upper deck,
a cargo area configured to accommodate at least one passenger and situated at a different level to the upper deck, and
at least one accessway between the upper deck and the cargo area, said at least one accessway including a plurality of steps including a first step just below said upper deck,
wherein the upper deck has at least locally a raised floor in the vicinity of the accessway so that at least a part of the cargo area has a ceiling height that is greater than a ceiling height of the rest of the cargo area,
and wherein said upper deck comprises a stationary inclined partition at least partially forming a ceiling having a slope that is the same as a slope of the accessway, said ceiling starting vertically above said first step and extending vertically above at least some of said plurality of steps.

2. The aircraft cabin according to claim 1, wherein the accessway opens onto a landing of the cargo area.

3. The aircraft cabin according to claim 2, wherein the raised floor is located vertically above the landing, so that the landing is provided with a ceiling height that is greater than a ceiling height of the rest of the cargo area.

4. The aircraft cabin according to claim 1, wherein the upper deck comprises at least one of a wash-stand, toilets and a service area opposite the stationary inclined partition.

5. The aircraft cabin according to claim 4, wherein the raised floor forms a floor of the upper deck in front of the at least one of the wash-stand, the toilets and the service area of the upper deck.

6. The aircraft cabin according to claim 4, wherein said stationary inclined partition carries said at least one of the wash-stand and said toilets.

7. The aircraft cabin according to claim 1, wherein the raised floor is located vertically above a surface of the cargo area located in the vicinity of a top step of the accessway, on the cargo area side, of a staircase forming the accessway.

8. The aircraft cabin according to claim 1, wherein a first portion of said stationary inclined partition is horizontally extended by said raised floor.

9. The aircraft cabin according to claim 1, wherein said raised floor is independent from said stationary inclined partition.

\* \* \* \* \*